(12) United States Patent
Choi et al.

(10) Patent No.: US 9,082,020 B2
(45) Date of Patent: Jul. 14, 2015

(54) APPARATUS AND METHOD FOR CALCULATING AND DISPLAYING THE HEIGHT OF AN OBJECT DETECTED IN AN IMAGE ON A DISPLAY

(71) Applicant: Hyundai Motor Company, Seoul (KR)

(72) Inventors: Jae Seob Choi, Gyeonggi-do (KR); Dae Joong Yoon, Gyeonggi-do (KR); Eu Gene Chang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 429 days.

(21) Appl. No.: 13/692,229

(22) Filed: Dec. 3, 2012

(65) Prior Publication Data

US 2014/0104423 A1   Apr. 17, 2014

(30) Foreign Application Priority Data

Oct. 11, 2012   (KR) .................. 10-2012-0113141

(51) Int. Cl.
*H04N 7/18*   (2006.01)
*G06K 9/00*   (2006.01)

(52) U.S. Cl.
CPC ........ *G06K 9/00791* (2013.01); *G06K 9/00805* (2013.01)

(58) Field of Classification Search
USPC .................. 348/135, 148; 340/435, 901, 903; 382/103, 106
See application file for complete search history.

(56) References Cited

U.S. PATENT DOCUMENTS

| 6,191,704 B1 * | 2/2001 | Takenaga et al. ............. 340/903 |
| 2012/0039508 A1 * | 2/2012 | Cao et al. ...................... 382/103 |

FOREIGN PATENT DOCUMENTS

| JP | 10062162 A | 3/1998 |
| JP | H10187930 A | 7/1998 |
| JP | 2011109170 A | 6/2011 |
| KR | 10-2005-0036179 | 4/2005 |
| KR | 10-0972041 | 7/2010 |

* cited by examiner

*Primary Examiner* — Thai Tran
*Assistant Examiner* — Mishawn Dunn
(74) *Attorney, Agent, or Firm* — Mintz Levin Cohn Ferris Glovsky and Popeo, P.C.; Peter F. Corless

(57) ABSTRACT

Disclosed is an apparatus for calculating the actual height of an object and displaying the calculated height on an image, including: an object detection unit that detects an object in an image of the vehicle's surroundings acquired by a camera disposed on a vehicle; an object position measurement unit that measures a position of the object in the image and measures an object distance and an object length of the object in the image based on a distance value acquired by a distance measuring sensor disposed on the vehicle; an object height calculation unit that calculates an object height using the object distance and the object length of the object displayed in the image; and a display controller controlling display of the calculated the height of the object on a display.

13 Claims, 8 Drawing Sheets

→ : DISTANCE TO OBJECT IN IMAGE
    (ULTRASONIC SENSOR MEASUREMENT DISTANCE)

→ : LENGTH OF OBJECT IN IMAGE

→ : ACTUAL HEIGHT OF OBJECT

|  | A |  |  |
|---|---|---|---|
|  | 100cm | 200cm | 230cm |
| 0cm | 100cm | 200cm | 230cm |
| 25cm | 117cm | 236cm | 294cm |
| 50cm | 152cm | 309cm | – |
| 75cm | 271cm | – | – |
| 100cm | 300cm | – | – |

C (left column), B (bottom)

Fig.5

APPARATUS AND METHOD FOR CALCULATING AND DISPLAYING THE HEIGHT OF AN OBJECT DETECTED IN AN IMAGE ON A DISPLAY

CROSS-REFERENCE TO RELATED APPLICATIONS

This application claims priority under 35 U.S.C. §119(a) to Korean patent application No. 10-2012-0113141, filed on Oct. 11, 2012, the disclosure of which is hereby incorporated in its entirety by reference.

BACKGROUND OF THE INVENTION

1. Field of the Invention

The present invention relates to an apparatus and a method for display control of an object, and more particularly, to an apparatus and a method for displaying actual height information of an object on a surrounding image of a vehicle acquired through a camera.

2. Description of the Related Art

Recently, technology has been incorporated into vehicles that allows an image, or images, of a vehicles surroundings to be captured and visualized on a display in the vehicle, which allows the driver to easily assess relevant situations (e.g., the presence of animals, people, objects, etc.) within the vicinity of the vehicle. For example, the technology may obtain images (e.g., photographs) from all sides of the vehicle, and convert the images into top view images by synthesizing the respective images obtained from all sides of the vehicle. The synthesized image may then be provided to the user, so that the user may confirm the images of all sides of the vehicle at one time. Unfortunately, a significant disadvantage of such conventional technology is that it does not allow the user to assess the actual height of an object displayed in the image, which may result in the vehicle crashing into an object.

To address this issue, recent technologies have attempted to provide height information to the user by calculating the height of the object. For example, one such technology is based on extracting a contour line from an object assumed to be an obstacle from images acquired by two cameras installed at different angles, and then calculating vertical positions of the top and the bottom of the extracted contour line to calculate a distance to the obstacle and a height of the obstacle. Unfortunately, a significant disadvantage of this technology is that it requires the presence of at least two cameras that are installed at different angles in order to calculate the height of the obstacle. In other words, there is a problem in that the above-mentioned technology may not be applied to a vehicle in which only one camera is installed. In addition, since the two images are compared with each other to calculate the height of the obstacle, height calculation errors may occur as a result of errors and/or discrepancies in the individual images.

SUMMARY OF THE INVENTION

The present invention provides an apparatus and a method for calculating an actual height of an object displayed in an image of the surroundings of a vehicle acquired through a camera, and displaying the calculated height information on the image to allow a user to recognize accurate information about the object.

In accordance with an exemplary aspect of the present invention, an apparatus for calculating the actual height of an object and displaying the calculated height on an image may include: an object detection unit for detecting an object in an image of the vehicle's surroundings acquired by a camera included in the vehicle; an object position measurement unit for measuring the position of the object in the image and measuring the distance to the object, and a length of the object in the image based on a measured distance value acquired by a distance measuring sensor included in the vehicle; an object height calculation unit for calculating the height of the object using information about the distance to the object and the length of the object displayed in the image; and a display controller for controlling the display of the calculated height of the object. The object height calculation unit may calculate the height of the object by applying the information on the distance to the object and the length of the object displayed in the image of the vehicle's surroundings to a pre-stored mapping table. The object height calculation unit may calculate the height of the object by applying the information on the distance to the object and the length of the object displayed in the image of the vehicle's surroundings to a previously generated conversion curve graph. The conversion curve graph may arrange different conversion curves indicating, for example, a height value corresponding to the distance to the object and the length of the object in a predetermined unit according to the distance to the object. The conversion curve may be a curve in which a gradient becomes smaller as the height of the object becomes higher. For different exemplary conversion curves, a gradient may become smaller as the distance to the object and the length of the object becomes longer in response to the same height value.

In accordance with another exemplary aspect of the present invention, a method for calculating the actual height of an object and displaying the calculated height on an image, includes: detecting an object in an image of the vehicle's surroundings acquired by a camera included in the vehicle; measuring a position of the object in the image of the vehicle's surroundings and measuring a distance to the object and a length of the object in the image based on the distance measuring value acquired by a distance measuring sensor included in the vehicle; calculating a height of the object using information on the distance to the object and the length of the object displayed in the image of the vehicle's surroundings; and displaying the calculated height of the object on a screen. Calculating the height of the object may include calculating the height of the object by applying the information on the distance to the object and the length of the object displayed in the image to a pre-stored mapping table. Calculating the height of the object may include calculating the height of the object by applying the information on the distance to the object and the length of the object displayed in the image of the vehicle's surroundings to a previously generated conversion curve graph. The conversion curve graph arranges different conversion curves indicating a height value corresponding to the distance to the object and the length of the object in a predetermined distance unit. The conversion curve may be a curve in which a gradient becomes smaller as the height of the object becomes higher. In different exemplary conversion curves, a gradient may become smaller as the distance to the object and the length of the object becomes longer in response to the same height value.

BRIEF DESCRIPTION OF THE DRAWINGS

The objects, features and advantages of the present invention will be more apparent from the following detailed description in conjunction with the accompanying drawings, in which:

FIG. 5 is an exemplified diagram illustrating another example of FIG. 4;

Figure 1:
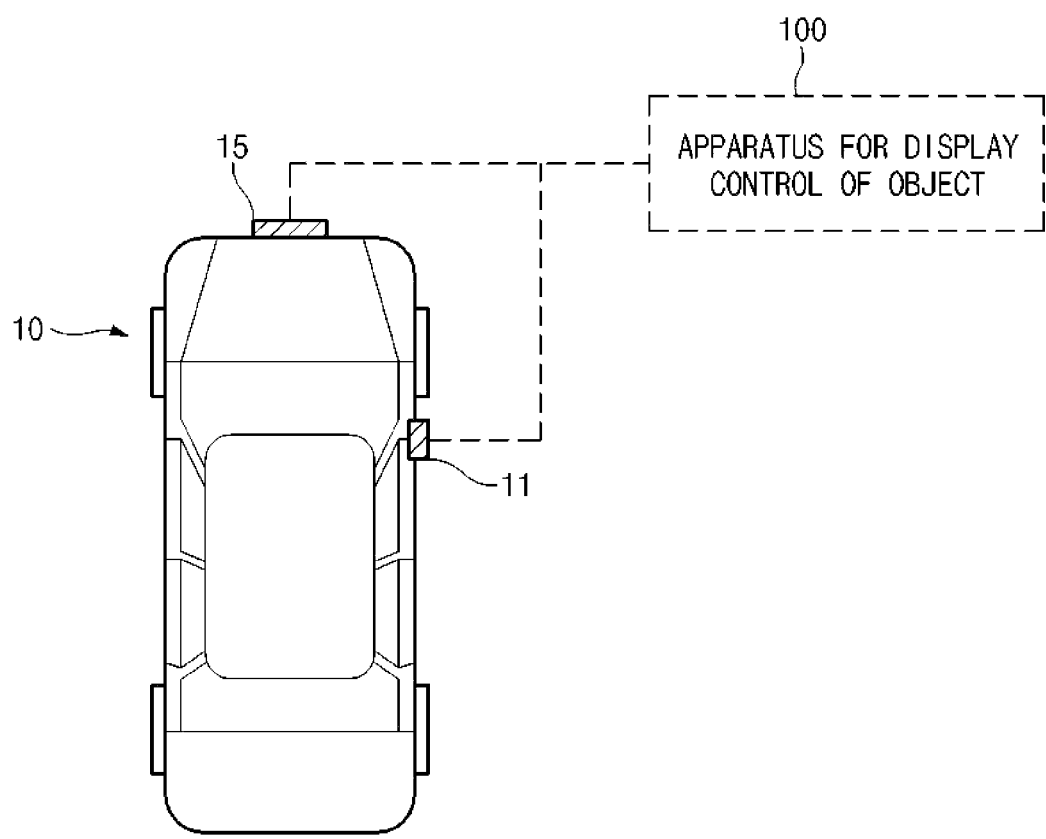
FIGS. 1 and 2 are diagrams illustrating a configuration of an apparatus for display control of an object according to an exemplary embodiment of the present invention.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

DETAILED DESCRIPTION OF EXEMPLARY EMBODIMENTS

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Additionally, it is understood that the below methods are executed by at least one controller. The term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 2:
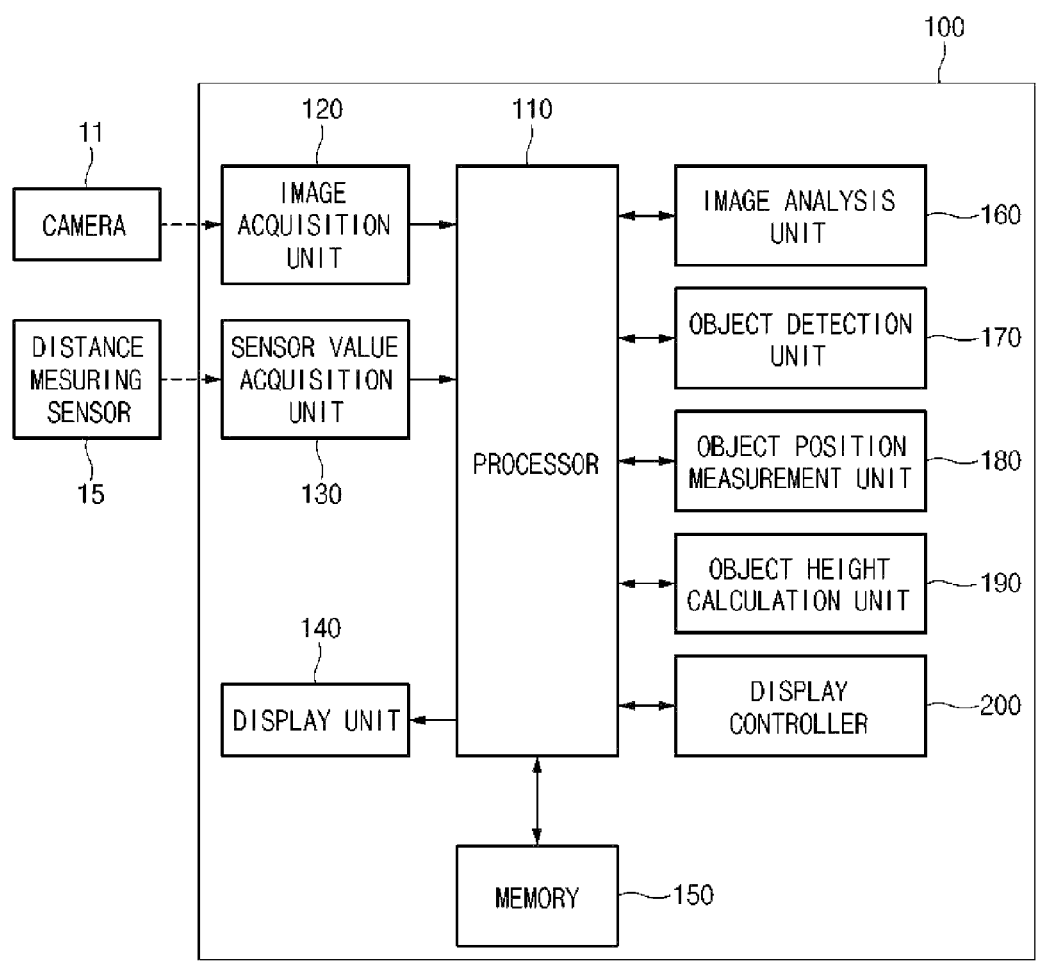

FIGS. 1 and 2 are diagrams illustrating a configuration of an apparatus for calculating the actual height of an object and displaying the calculated height on an image according to an exemplary embodiment of the present invention.

Referring to FIG. 1, a vehicle 10 may include a camera 11 photographing a surrounding image of the vehicle 10 and a distance measuring sensor 15 measuring a distance between one or more objects positioned around the vehicle 10. Although FIG. 1 depicts only one camera 11 and one distance measuring sensor 15, it is contemplated within the scope of the disclosure that a plurality of cameras 11 and distance measuring sensors 15 may be positioned at the front, rear, left, right and/or top sides of the vehicle 10, respectively. Additionally, the one or more cameras 11 and distance measuring sensors 15 may also be disposed only in a measurement direction according to selection of the user.

The apparatus 100 for calculating the actual height of an object and displaying the calculated height on an image may calculate an actual height of the object positioned around the vehicle 10 using information acquired through the camera 11 and the distance measuring sensor 15 of the vehicle 10 and display the calculated height of the object to enable the user to accurately recognize and assess the environment surrounding the vehicle.

Referring to FIG. 2, the apparatus 100 (e.g., a controller) for calculating the actual height of an object and displaying the calculated height on an image may include a processor 110, memory 150, a display unit 140 (e.g., a screen, monitor, etc.), and a display controller 200. In an exemplary embodiment, the apparatus may include a plurality of units (e.g., software modules) executed by the processor, the units including: an image acquisition unit 120, a sensor value acquisition unit 130, an image analysis unit 160, an object detection unit 170, an object position measurement unit 180, and an object height calculation unit 190. Here, the processor 110 may control operations of each unit of the apparatus 100 for calculating the actual height of an object and displaying the calculated height on an image.

The image acquisition unit 120 may be connected to the camera 11 so as to acquire the surrounding image photographed through the camera. The sensor value acquisition unit 130 may be connected to the distance measuring sensor 15 to acquire a distance measuring sensor value measured through the distance measuring sensor 15. The surrounding image acquired by the image acquisition unit 120 and the distance measuring sensor value acquired by the sensor value acquisition unit 130 may be used to calculate the height of the object.

The display unit 140, which is a unit displaying the height of the object calculated by the apparatus 100, and may correspond to a monitor, a navigation system, entertainment system, or the like.

The storage unit 150 may store one or more data values for the apparatus 100 to aide in calculating the actual height of an object and displaying the calculated height on an image, such as, for example, the resulting data from the operations of each unit (e.g., image analysis unit, object detection unit, etc.), and the like, therein.

The image analysis unit 160 may analyze the image of the vehicle's surroundings acquired by the image acquisition unit 120. Here, the image of the vehicle's surroundings may be an image in an original form acquired by the image acquisition unit 120 or an image in a form in which the images acquired by the image acquisition unit 120 are converted into top view images and then synthesized. Although the object or obstacle may be detected based on the top view image, the present invention is not limited thereto.

The object detection unit 170 may detect the objects in the image of the vehicle's surroundings based on the image analysis results from the image analysis unit 160. In this case, the object detection unit 170 may also detect the objects based on the distance measuring value acquired by the sensor value acquisition unit 130.

The object position measurement unit 180 may measure the position of the object detected through the object detection unit 170 in the image of the vehicle's surroundings. In this case, the object position measurement unit 180 measures the position of the object based on the distance measuring value acquired through the distance measuring sensor 15 included in the vehicle. More specifically, the object position measurement unit 180 may measure the distance to the object and the length of the object in the surrounding image to measure the position of the object.

Figure 4:
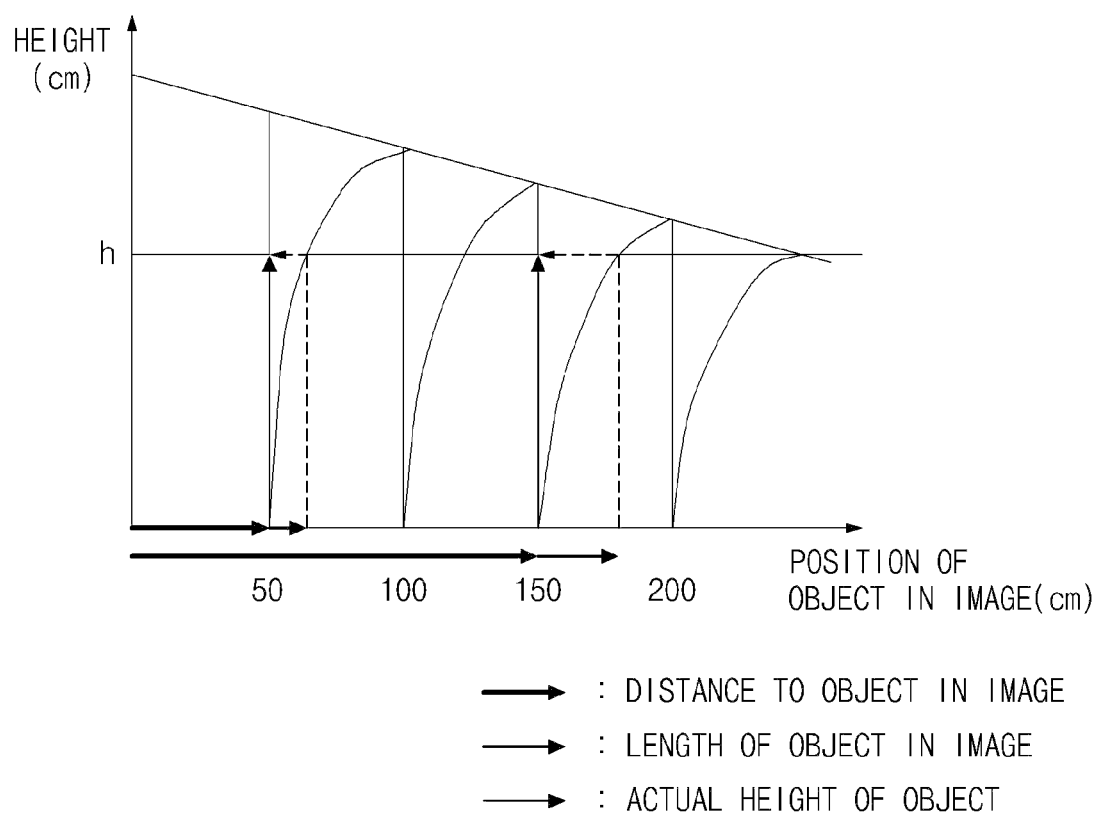
FIG. 4 is an exemplified diagram illustrating an object height calculation operation of the apparatus for calculating the actual height of an object and displaying the calculated height on an image according to an exemplary embodiment of the present invention.

The object height calculation unit 190 may calculate the height of the object using information on the distance to the object and the length of the object displayed in the surrounding image. In this case, the object height calculation unit 190 may calculate the height of the object by applying the information on the distance to the object and the length of the object displayed in the image of the vehicle's surroundings to the previously generated conversion curve graph. Here, the conversion curve graph may arrange different conversion curves indicating height values corresponding to the distances to the object and the lengths of the object in a predetermined distance unit, wherein each of the conversion curves may be a curve in which a gradient becomes smaller as the height of the object becomes higher. In addition, in the different conversion curves, a gradient may becomes smaller as the distances to the object and the lengths of the object becomes longer in response to the same height value. An example of the conversion curve graph is shown in FIG. 4.

Meanwhile, the object height calculation unit 190 may calculate the height of the object by applying the information on the distance to the object and the length of the object displayed in the image of the vehicle's surroundings to a pre-stored mapping table. An example of the pre-stored mapping table is shown in FIG. 5.

Figure 6:
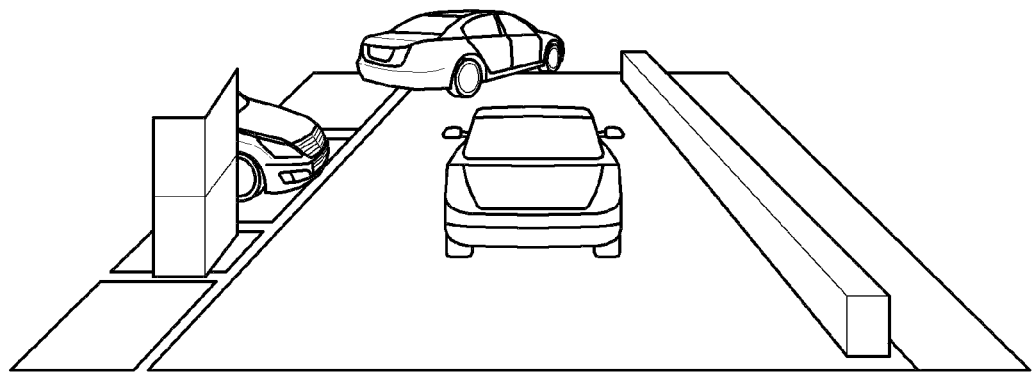
FIGS. 6 and 7 are exemplified diagrams illustrating an example of displaying the height of the object by the apparatus for calculating the actual height of an object and displaying the calculated height on an image according to an exemplary embodiment of the present invention.
Figure 7:
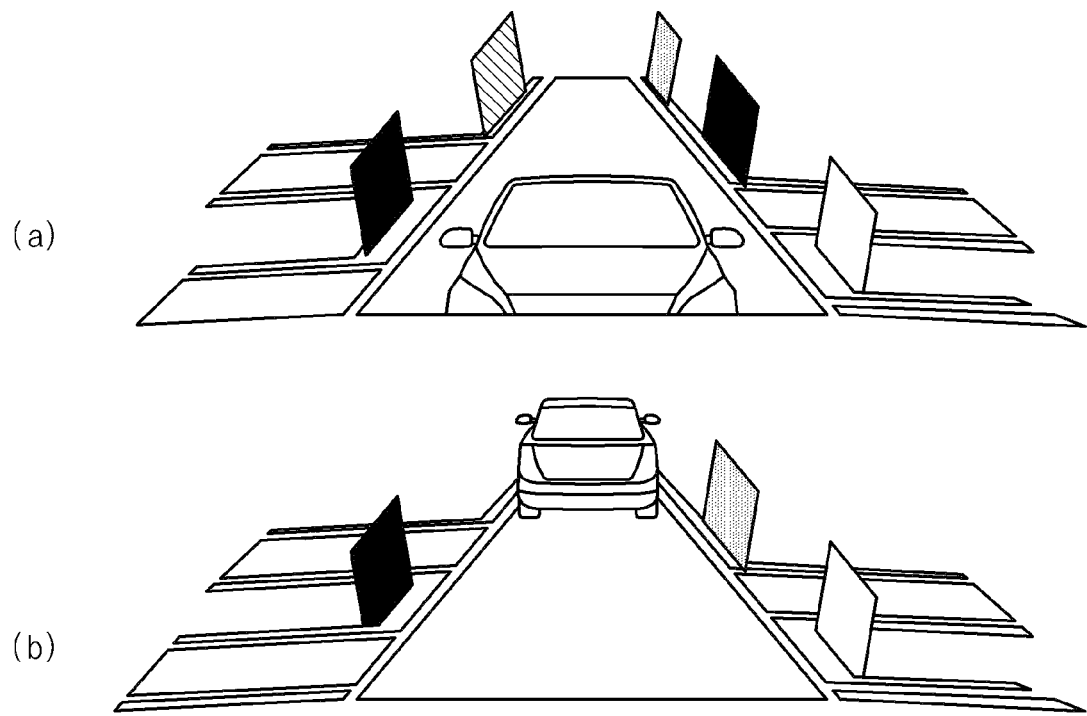

The display controller 200 may enable the height of the object calculated by the object height calculation unit 190 to be displayed on the image of the vehicle's surroundings in the state in which the image is displayed through the display unit 140, as shown in FIGS. 6 and 7.

Figure 3:
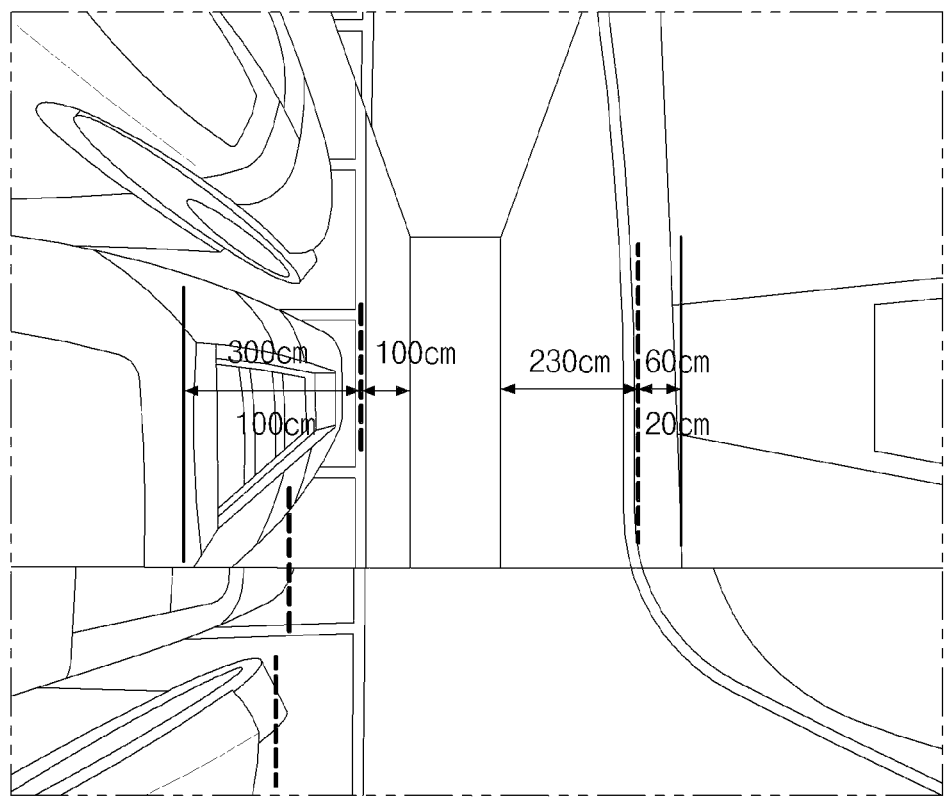
FIG. 3 is an exemplified diagram illustrating an object height display operation of the apparatus for calculating the actual height of an object and displaying the calculated height on an image according to an exemplary embodiment of the present invention.

FIG. 3 is an exemplified diagram illustrating an object height display operation of the apparatus 100 for displaying the calculated height on an image according to the exemplary embodiment of the present invention.

FIG. 3 displays the distance to the object, the length of the object, and the actual height of the object on the top view image for the image of the vehicle's surroundings acquired through the camera 11, in which the vehicle is represented by the centrally located rectangle. Here, the distance to the object is measured based on the sensor value acquired by the distance measuring sensor 15, and the measured distance value to the object is displayed on the top view image. For example, when a distance to an object in a left direction measured by the distant measuring sensor is 100 cm and a distance to an object in a right direction measured by the distant measuring sensor is 230 cm, the apparatus 100 for display control of an object enables the distances to each of the objects measured through the distance measuring sensor to be displayed on the top view image.

In addition, the apparatus 100 for displaying the calculated height on an image may measure the length of the object in the top view image and calculate a length corresponding to the length of the object displayed on the top view image based on the actual distance to the object measured through the distance measuring sensor 15. As an example, when a length of a corresponding object is about three times longer than a distance to the object based on a position of an object displayed in the left direction on the top view image, the apparatus 100 may calculate that the length of the object is 300 cm based on the distance to the object. As another example, when a length of a corresponding object is shorter than a distance to the object based on a position of an object displayed in the right direction on the top view image, the apparatus 100 may calculate the length of the object in proportion to the distance to the object.

When it is calculated that the length of the object in the right direction of the vehicle is 60 cm, an apparatus for height display of an object may display the calculated length together with the length of the object in the left direction of the vehicle on the top view image.

The apparatus 100 for calculating the actual height of an object and displaying the calculated height on an image may apply information on the distances to the objects in the left and right directions displayed on the top view image and the lengths of the objects to a pre-defined mapping table or conversion curve graph in order to calculate the actual height of the objects. When the actual height of the object in the left direction calculated as described above is 100 cm and the actual height of the object in the right direction is 20 cm, the height information calculated for each object is displayed on the top view image, thereby enabling the user to recognize the actual height of the object through the top view image.

FIG. 4 is an exemplified diagram illustrating an object height calculation operation of the apparatus 100 for display control of an object according to the exemplary embodiment of the present invention. In the conversion curve graph, the horizontal axis represents the position (cm) of the object in an image, e.g., a distance to the object and a length of the object, and the vertical axis represents the actual height (cm) of the object displayed on the image. The conversion curve graph has a form in which the different conversion curves are arranged in a unit series of 50 cm intervals, which may be based on the distance to the object. In this case, each conversion curve is a curve in which the gradient becomes smaller as the height of the object becomes higher. Additionally, in the different conversion curves, a gradient may become smaller as the distances to the object and the lengths of the object become longer in response to the height value. For example, each of the conversion curves shown in FIG. 4 has a form in which it is inclined toward the right as the height of the object increases. Meanwhile, in the case of the conversion curve in which the distance to the object is 50 cm, when the length of the object is 13 cm, the height of the object becomes h; however, in the case of the conversion curve in which the distance to the object is 150 cm, when the length of the object is 31 cm, the height of the object becomes h.

The conversion curve graph as described above may be defined through several repeated experiments and be a graph defined by a simulation apparatus, or the like. It is contemplated within the scope of the disclosure that the method of defining the conversion curve graph is not limited to any one method, but may be variously applied according to a desired embodiment.

Accordingly, the apparatus 100 for calculating the actual height of an object and displaying the calculated height on an image may easily calculate the height of the object by applying information on the distance to the object and the length of the object measured based on the surrounding image and the distance measuring value to the conversion curve graph shown in FIG. 4.

FIG. 5 is an exemplified diagram a mapping table of defining the height of the object corresponding to the position of the object. In the mapping table of FIG. 5, a region "A" represents the distance value to an object, a region "B" represents a value obtained by summing up a distance to the object and a length of the object, and a region "C" represents a height value of the object. In other words, in the case in which the distance to the object in the surrounding image is 100 cm, when the lengths of the object are 0 cm, 17 cm, 52 cm, 171 cm, and 200 cm, respectively, the values obtained by summing up the distances to the object and the lengths of the object in the region B correspond to 100 cm, 117 cm, 152 cm, 271 cm, and 300 cm, respectively.

Additionally, in the case in which the distance to the object in the surrounding image is 200 cm, when the lengths of the objects are 0 cm, 36 cm, and 109 cm, respectively, the values obtained by summing up the distances to the object and the lengths of the object in the region B correspond to 200 cm, 236 cm, and 309 cm, respectively. In addition, in the case in which the distance to the object in the surrounding image is 230 cm, when the lengths of the objects are 0 cm and 64 cm, respectively, the values obtained by summing up the distances to the object and the lengths of the object in the region B correspond to 230 cm and 294 cm, respectively.

Here, when the distance to the object and the length of the object are predetermined values or more, since they may not be displayed on the surrounding image, the mapping table may be defined within a predetermined range.

The mapping table as described above may be defined by: the results of several repeated experiments, a simulation apparatus, or the like. The method of defining the mapping table is not limited to any one method, but may be variously applied according to an embodiment.

Accordingly, the apparatus 100 for display control of an object may easily calculate the height of the object by applying information regarding the distance to the object and the length of the object measured by the object position measurement unit 180 to the mapping table shown in FIG. 5.

FIGS. 6 and 7 are exemplified diagrams illustrating an example of displaying the height of the object by the apparatus 100 for display control of an object according to the exemplary embodiment of the present invention.

The method for displaying the height of the object on the surrounding image may be implemented in various ways. For example, the height of the object may be displayed on an original image acquired through the camera 11 and be displayed on the top view image. In addition, colors, shapes, or the like, may be displayed differently and a separate icon may be disposed, according to the height of the object. Meanwhile, the apparatus 100 for display control of an object may display the height information in a character shape on an existing surrounding image, as shown in FIG. 3.

As an example, FIG. 6 is diagram illustrating an example in which a distance and a kind of object are recognized and a corresponding icon is then displayed on the display. In other words, when the object in the right direction of the vehicle is sensed to be a curb, an icon corresponding to a curb may be displayed to the right of the vehicle. The apparatus 100 may display the curb so as to have the height value corresponding to the calculated height of the object. In other words, the displayed icon may be shown proportionally, so that the displayed icon is sized relative to other objects on the display in a manner consistent with its actual size in the real world.

As another example, FIG. 7 illustrates an object according to a viewpoint designed to assist the user in parking the vehicle. For example, FIG. 7A illustrates an example of displaying objects located at the rear of the vehicle in the case in which the vehicle moves forward. Similarly, FIG. 4B illustrates an example of displaying objects located at the rear of the vehicle in the case in which the vehicle moves backward. Likewise, also in this case, the sensed objects may be displayed on the display so as to have different colors, shapes, or the like, and may also be displayed so as to have the height value corresponding to the calculated height of the object.

Therefore, the user displays the objects so as to be distinguished from one another according to the viewpoint of the objects viewed from the vehicle, a kind of objects, a distance, and the like. Here, the objects are displayed together with the calculated height information, thereby making it possible to easily recognize a collision risk between the vehicle and the object, or the like.

An operation flow of the apparatus 100 for calculating the actual height of an object and displaying the calculated height on an image according to the exemplary embodiment of the present invention as described above will be described in detail.

Figure 8:
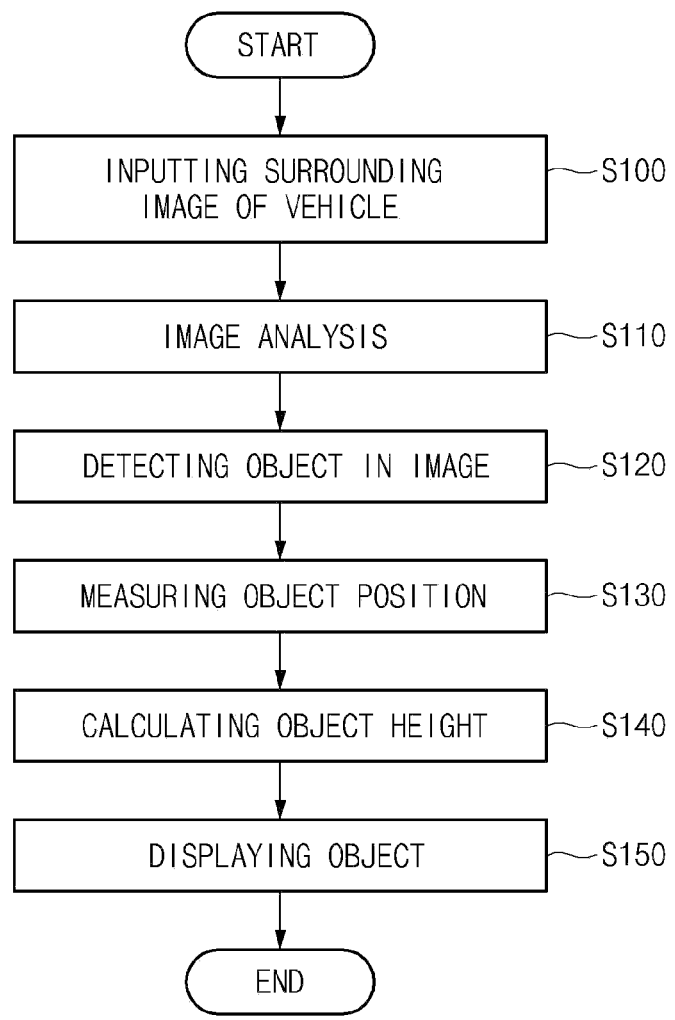
FIG. 8 is a flow chart illustrating an operation process of a method for calculating the actual height of an object and displaying the calculated height on an image according to an exemplary embodiment of the present invention.

FIG. 8 is a flow chart illustrating an operation flow of a method for display control of an object according to the exemplary embodiment of the present invention. When the surrounding image of the vehicle acquired through the camera 11, and the like, is input (S100), the apparatus 100 may analyze the input image (S110) and detects the object in the image (S120).

According to the techniques herein, the apparatus 100 may then measures a position of the object detected at step S120 (S130). More particularly, at step S130, the distance to the object and the length of the object in image that are detected from the vehicle may be measured. Here, the distance to the object may be measured based on the distance measuring value acquired by the distance measuring sensor 15, or the like, and the length of the object may be measured in proportion to the distance to the distance displayed in the image.

The apparatus 100 for display control of an object calculates the height of the object based on the distance to the object and the length of the object which are measured at step S130 (S140). In this case, in order to calculate the height of the object, a process of defining a conversion curve graph or a mapping table may be performed previously.

The apparatus 100 may calculate the height of the object by applying the distance to the object and the length of the object that are measured at step S130 to a pre-defined conversion curve graph or mapping table.

The apparatus 100 may then display the height information of the object calculated at step S140 on the image inputted at step S100 (S150). The height information of the object may also be displayed on the image converted from the image inputted at step S100.

According to the exemplary embodiments of the present invention, the actual height of the object displayed on the surrounding image of the vehicle acquired through the camera may be calculated, and the calculated height information of the object may be displayed on the surrounding image, such that the user may recognize the accurate information on the object through the surrounding image display on the screen.

Further, according to the exemplary embodiments of the present invention, the height of the object is calculated through the length to the object and the length of the object, thereby making it possible to simply and rapidly calculate the height of the object without adding a separate apparatus.

As described above, although the apparatus and the method for display control of an object according to the exemplary embodiment of the present invention has been described with reference to the accompanying drawings, the present invention is not be limited to the exemplary embodiments and the drawings disclosed in the present specification, but can be applied without departing from the spirit and the scope of the present invention.

What is claimed is:

1. An apparatus, comprising:
one or more processors;
memory;
an image acquisition unit that receives one or more images from a camera;
a sensor value acquisition unit that receives a distance value from a distance measuring sensor;
an image analysis unit that processes the one ore more images into one or more processed images;
an object detection unit that detects one or more objects in the one or more processed images;
an object position measurement unit that measures one or more positions of the one or more objects and determines an object distance to each of the one or more objects and an object length of each of the one or more objects in the one or more processed images based on the distance value;
an object height calculation unit that calculates an object height of each of the one or more objects based on the determined object distance and the determined object length; and
a display controller that communicates the determined object height to a display.

2. The apparatus of claim 1, wherein the object height calculation unit calculates the object height by applying the object distance and the object length to a pre-stored mapping table.

3. The apparatus of claim 1, wherein the object height calculation unit calculates the object height by applying the object distance and the object length to a conversion curve graph.

4. The apparatus of claim 3, wherein the conversion curve graph arranges different conversion curves indicating a height value corresponding to the object distance and the object length in a predetermined unit series based on the object distance.

5. The apparatus of claim 4, wherein the conversion curve is a curve in which a gradient becomes smaller as the height of the object becomes higher.

6. The apparatus of claim 4, wherein the gradient becomes smaller as the object distances and the object lengths become longer in response to a same height value.

7. A method, comprising:
receiving an image from a camera disposed on a vehicle;
receiving a distance value from a distance measuring sensor;
processing the image into a processed image;
detecting an object in the processed image;
measuring a position of the object in the processed image to determine an object distance and an object length based on the distance value, the object distance corresponding to a distance between the vehicle and the object and the object length corresponding to a distance between a first end and a second end of the object;
calculating an object height based on the object distance and the object length; and
displaying the calculated object height on a display.

8. The method of claim 7, wherein calculating the object height further comprises calculating the height of the object by applying the object distance and the object length to a pre-stored mapping table.

9. The method of claim 7, wherein calculating the object height further comprises calculating the object height by applying the object distance and the object length to a previously generated conversion curve graph.

10. The method of claim 9, wherein the conversion curve graph comprises different conversion curves arranged so that the object height corresponds to the distance to the object and the length of the object in a predetermined distance unit series.

11. The method of claim 10, wherein the conversion curve is a curve in which a gradient becomes smaller as the height of the object becomes higher.

12. The method of claim 10, wherein in conversion curve comprises one or more curves in which the gradients become smaller as the distances to the object and the lengths of the object become longer in response to a same height value.

13. A non-transitory computer readable medium containing program instructions executed by a processor or controller, the computer readable medium comprising:
program instructions that receive an image from a camera disposed on a vehicle;
program instructions that receive a distance value from a distance measuring sensor;
program instructions that process the image into a processed image;
program instructions that detect an object in the processed image;
program instructions that measure a position of the object in the processed image to determine an object distance and an object length based on the distance value, the object distance corresponding to a distance between the vehicle and the object and the object length corresponding to a distance between a first end and a second end of the object;
program instructions that calculate an object height based on the object distance and the object length; and
program instructions that display the calculated object height on a display.

* * * * *